United States Patent Office 2,869,934
Patented Jan. 20, 1959

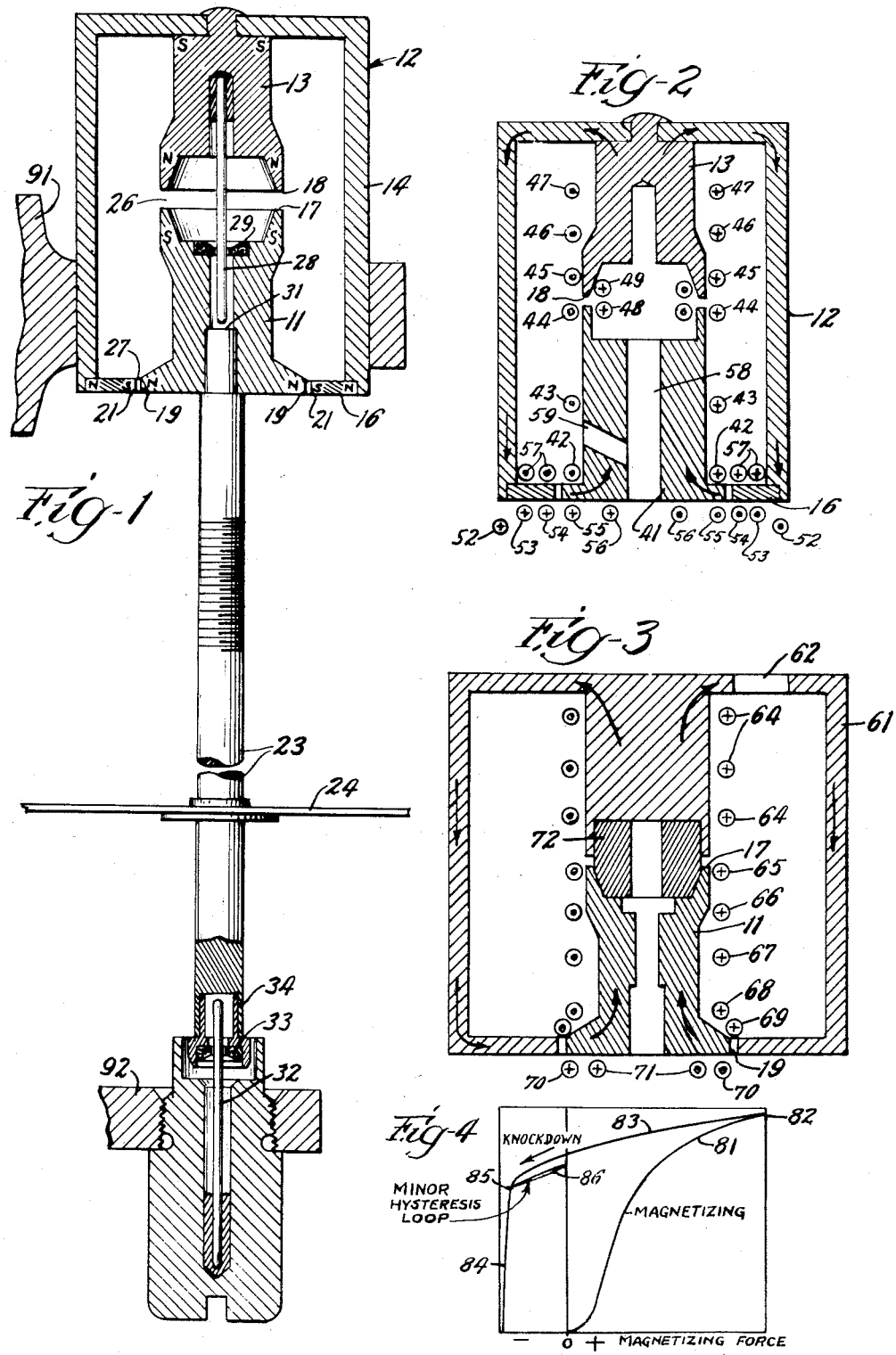

2,869,934

MAGNETIC SUSPENSIONS

James W. Milligan, West Lafayette, and Stanley S. Green, Indianapolis, Ind., assignors, by mesne assignments, to Duncan Electric Company, Inc., a corporation of Indiana Application June 8, 1953, Serial No. 359,989

24 Claims. (Cl. 308—10)

For many years there has been recognition that the weight of a rotation part could be suspended magnetically and in theory almost eliminate bearing friction. A few magnetic suspensions of rotating elements of meters have been commercially known.

The many magnetic suspensions which have been proposed in the past include some using attraction of opposed magnetic poles, and some using repulsion of "like" magnetic poles. The latter need not be considered at this time. The forms using magnetic attraction can be divided into two main types of which one is characterized by having only radial gaps or concentric poles, while the other includes at least one axial gap. Radial gaps are characterized by the fact that a smaller and perhaps annular pole on the rotating element lies more or less within a larger annular pole of the stationary element. In the axial gap form, the stationary and rotary poles may be of the same diameters and directly facing one another in the axial direction, so that axial movement of the rotary element moves one magnet face directly toward and from the other.

The axial gap types proposed heretofore have been subject to instability. In fact, if there are only axial gaps, there cannot be complete balanced suspension of the weight of the rotating element. It must rest either on a bottom bearing or a top bearing.

Magnetic suspensions which did not rest on a top or bottom bearing have heretofore been subject to at least one objection in that they were relatively "soft." This means that a relatively small axial force applied to the rotating part could move it a significant distance. Those magnetic suspensions of the radial gap type having no axial gap were also subject to having a rather appreciable side thrust if moved radially out of the exactly concentric position within the stationary annular poles. In some forms this was severe enough to be objectionable. One form which minimized this fault did so by using axially magnetized cylindrical magnets, but this type of design is excessively "soft" and needs added shielding to reduce the danger of harmful effects from external fields.

According to the present invention, a magnetic suspension is provided which is relatively firm, which has an axial gap with its tendency to produce radial centering, and which nevertheless operates in a vertically suspended condition, not resting on either top or bottom bearing. Also, the outer shell is mainly of non-permanent magnetic material making added shielding unnecessary, especially since there is no outer axially magnetized permanent magnetic to be relatively easily affected by an external field.

The preferred forms of the invention use both an axial gap and a radial gap, both formed by narrow directly opposed faces. The axial gap not only provides an axial lift which produces the main supporting force but also provides a lateral or radial centering tendency to at least partially counteract any decentering tendency of the radial gap. The radial gap provides axial stability by making up the difference between the weight of the rotating part and the lift of the axial gap, the rotating element of course assuming an axial position at which the gaps have this balanced effect. Narrow directly opposed radially facing pole faces with radial magnetization constitute an important factor in providing "stiffness."

An important feature of the invention is in maintaining a relatively constant flux in the concentrated flux areas of the gaps. In the illustrated form of the invention, this constancy of concentrated flux is maintained by forming the gaps between permanent magnetic poles of high coercivity which operate on minor hysteresis loops of low incremental permeability. To provide an exceptionally high degree of concentration, a new method of magnetization is preferred, in which the magnetizing flux is forced through the pole faces so that the high coercive pole members are highly magnetized in the desired direction and have substantially no magnetization other than in that direction. Another form of high concentration of flux maintained relatively constant is provided through the use of saturated lengths of non-permanent magnetic material leading to the pole tips. The details of this latter form are discussed in a separate application, Serial No. 359,990, also filed June 8, 1953.

Both of the above-mentioned forms of the invention preferably use a combination of annular gaps, one between annular axially-facing poles and the other between annular radially-facing poles. This combination lends itself to a proportioning of forces such that a high vertical stability is provided without being accompanied by a high lateral instability or side thrust resulting from displacement radially.

Designation of figures

Figure 1 is a sectional view partially broken away of a form of the invention chosen for illustration.

Figure 2 is a diagrammatic illustration of a preferred method of magnetizing the stator shown in Figure 1.

Figure 3 is a similar diagrammatic view illustrating a preferred method of magnetizing the rotor shown in Figure 1.

Figure 4 is a diagram showing a typical flux density versus coercive force curve for magnetizing and knockdown of a high-coercive material, and a minor hysteresis loop or curve.

Although the law requires a full and exact description of at least one form of the invention, such as that which follows, it is, of course, one purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

General description

In the form of the invention chosen for illustration, the magnetic suspension includes a rotor 11 formed mainly by a permanent magnet which may be designated by the same number. Surrounding it is a stator 12, which includes a permanent magnet 13, a soft iron yoke or cup 14 and a permanent magnet annulus 16. The magnets 11 and 13 have axially faced annular pole faces 17 and 18, respectively, of opposite polarity. The magnets 11 and 16 have radially directed annular pole faces 19 and 21, respectively, of opposite polarity. Each pole may be designated by the letter applied to its face.

The poles 17 and 18 at all times exert a lifting force on the rotor. Also, if the rotor is displaced laterally somewhat from its normal position, the magnetic attraction between poles 17 and 18 exerts a centering force tending to draw the rotor back to a position on its normal axis.

When the pole face 19 is in the illustrated position with respect to pole face 21, called the neutral position, the attraction between these poles is balanced and no net force is exerted by them on the rotor either axially or radially. If the rotating element, which includes shaft 23 and disk 24 as well as the rotor, is lighter than the force of attraction between the magnets 11 and 13, the rotating element will be lifted by this pull until the magnet face 19 is enough higher than the magnet face 21 so that there is a downward force produced by attraction between these faces enough to keep the forces in balance; the weight of the rotating element plus the downward force of radial poles equalling the lift of the axial pole. This of course assumes that the magnetic suspension is properly designed for the weight of the rotating element for the above-mentioned condition to be met. With a similar assumption, the rotating element 23, if heavier than the pull between magnets 11 and 13, will drop until the pole face 19 is enough below the pole face 21 so that the lifting force between them is again enough to balance the system of forces and stop further downward movement of the rotating element.

In the event of lateral displacement of the rotor, the pole face 19 will be closer to the pole face 21 at one side of the structure than at the opposite side. Accordingly, there will be a decentering force at this point. It may be assumed for the present that this decentering force is never quite overcome by the centering force between pole faces 17 and 18.

In summary, there is an axial gap 26 which tends to support and center the rotary structure and a radial gap 27 which tends, as needed, to complete the support of the rotary element or to restrain the rotary element from being drawn too high by the axial gap 26, but which (unfortunately for some uses) has a slight tendency toward the development of decentering forces.

If made in accordance with features still to be described, the magnetic suspension provides a high degree of vertical stability, the departure from horizontal stability not being excessive. Thus it has a high ratio of vertical stability or stiffness to horizontal instability.

A flexible guide pin 28 and a surrounding graphite bearing 29 are provided for maintaining lateral centering of the system. The pin 28 by its proximity to a top surface 31 on shaft 28, or other suitable surface, may also be used to positively limit the abnormal upward movement of the rotary element so that the pole faces 17 and 18 will never approach one another close enough to freeze or fail to move apart by gravity. The lower end of shaft 23 may be guided by a graphite bushing 33 and a bearing pin 32, which latter may also limit abnormal downward movement by engagement with a surface 34.

*Important additional features*

The attraction between two poles occurs mainly in the area of highly concentrated flux. It is important that this flux be maintained as uniformly as possible along all areas of the pole faces 17, 18, 19 and 21. This is important for a variety of reasons. With respect to poles 17 and 18, there has been a severe problem with axially faced poles of the past, due to a rapid increase of attractive force between them as they approached one another. Not only is it impossible to maintain axial stability with such poles alone, but, considered alone, they have been so highly unstable in the past that stabilizing them with radial poles has not heretofore proved practical. If the area of concentrated flux between such poles could be maintained constant in its flux density, there would be but little axial instability which would be easily overcome by radial poles. Although perfect constancy of the concentrated flux cannot be attained with a permanent magnet system and a varying gap, its approximation is highly desirable for the purpose of minimizing the instability at this point. Likewise, the relative uniformity of the concentrated flux increases the centering force at this point as compared to the centering force which would result if the flux density in the area of concentration were permitted to decrease as much as it has upon the moving apart of prior art pole faces.

In the case of the radial gap 27, the relative constancy of flux at all areas of concentration is likewise important for a greater increase in the axial component of attraction between the poles as they move axially away from one another. With respect to lateral stability, this factor is doubly important here because as the gap at one side of the structure decreases, the gap at the other side increases. Constant flux density would avoid lateral instability due to this cause, and an approach to constant flux density is desirable for minimizing the lateral instability.

This relatively constant flux density which is desirable at both gaps can be attained through the use of magnetic material which is operated under conditions of low incremental permeability. This means that a slight increase in the magnetic potential (magnetomotive force) which causes the flux to pass through the magnetic material in question will produce only a very small additional or incremental flux in that material. In magnetic suspensions, this additional magnetic potential is made available by a reduction in the gap length. Thus when the gap length is utilizing less of the total magnetic potential available from the permanent magnet system, a little more of that force is available for forcing flux through each portion of the magnetic material. In short, a material which is operating in a condition of low incremental permeability will experience a relatively slight change of flux for a given amount of change in gap length.

There are two conditions under which different magnetic materials can be made to operate with low incremental permeability and which can be used in accordance with the principles of this invention.

One condition involves the use of permanent magnet poles of material having minor hysteresis loops with a low degree of slope, suitable materials of this type also having high coercivity. In the illustrated form of the invention, the magnets 11 and 16 are formed of Cunico and the magnet 13 is formed of Cunife I.

The other condition providing low incremental permeability is the use of saturated sections of soft iron adjacent the pole faces. That is especially the subject of the separate application mentioned, except insofar as it represents a common concept with the above method illustrated in this application.

For the illustrated form, Cunife is preferred where it is suitable, because of a higher available energy and flux density and fair machineability. Cunico is preferred for magnets 11 and 16, however, because it is relatively free from a directional characteristic of magnetizability. A sphere of Cunico could be magnetized in any direction at random with substantially the same results, whereas a sphere of Cunife could be magnetized in one direction much more satisfactorily than in directions perpendicular thereto.

A very important part of the permanent magnet structure, from the standpoint of the unusual stability above discussed is that which lies adjacent the pole faces and extends rearwardly therefrom a significant distance. To understand this, it should be recognized that one great cause of diminution of flux density upon moving prior art pole faces apart has been the spreading back of the flux from the pole faces to the sides of the pole. Such spreading back would result in a diminution of flux density in addition to that which would result from a diminution of the total amount of flux between the two poles as they separate. Therefore, anything which minimizes the spreading of the flux around to the sides of the poles as the poles are additionally separated is desirable. Both a saturated pole section adjacent the pole face and a highly coercive pole section adjacent the face have this admirable ability. This function is best performed by the highly coercive pole.

The highly coercive pole adjacent the pole faces can also provide, regardless of gap changes, a remarkable concentration of flux through the pole faces. This effect is greatly increased by the method of magnetization illustrated in Figures 2 and 3. Broadly speaking, this method consists in magnetizing the poles in such manner that substantially all of the magnetizing flux in the vicinity of the pole faces is forced to pass perpendicularly through the pole faces.

Both the saturated poles and the permanent magnet poles are also useful in stabilizing the total flux, as well as its distribution. The saturated section tends to act somewhat as a valve, letting only a certain maximum flux pass easily.

The permanent magnets, including the pole portions obtain their relative stability of total flux by virtue of their nature and the fact that they are operated on a minor hysteresis loop of low incremental permeability.

If flux is allowed to spread away from the face of a pole, the effect is relatively much greater for a narrow pole face than for a very wide pole face. However, the use of narrow pole faces is very desirable for sharpness or firmness of their positioning. A given small movement of one pole laterally with respect to the other develops a relatively great restoring force if the faces are narrow, and if the total face area is adequate to provide the flux necessary for the required attractive force. When the pole 19 is displaced axially from its neutral position in pole 21, one edge of each pole face is axially overlapped by the other pole face. This overlapping edge can be designated the edge of its pole face in the direction of relative displacement of the other pole face from it. Abruptly defining the poles by these edges increases the stiffness or firmness mentioned because the added length of a flux path from the side of the poles instead of its face surface aids in resisting shifting of the flux.

Although a wider face may be needed for permanent magnet poles than for saturated soft iron poles, permanent magnet poles, if fairly narrow, are very sharp in the centering action because they resist a shifting of the flux to one side of the pole.

*Incremental permeability*

An important aspect in reaching the degree of stability which can be attained by this invention is in the use of magnetic material adjacent the various pole faces which has, in the condition in which it is used, a low incremental permeability. This has the effect of minimizing the increase of flux resulting from reducing the gap length. In the preferred forms of the invention, the magnet portions adjacent the pole tips have an incremental permeability of approximately 4 or less. However, incremental permeabilities of 10 or less would be making good use of this concept. Thus, the incremental permeability in Cunico as it is here used is in the neighborhood of 3. The incremental permeability of Cunife I as here used is even better, in the neighborhood of 2. The various Alnicos, though for this use presenting some difficulties of shaping or magnetization, would make good use of this concept, since they would operate at incremental permeabilities of about 4 to 7. The form of the invention using soft iron in a nearly saturated state, to which a companion application is more specifically directed, would preferably operate in a state having an incremental permeability of 10 or less, depending on the degree of saturation which was maintined, the ideal truly saturated state having an incremental permeability of 1, the same as air. An incremental permeability of "0" would be ideal—if it could be attained.

The meaning of incremental permeability can be made a little more clear with reference to Fig. 4. This is a chart showing typical magnetizing and knockdown curves for a permanent magnet material. The particular curves chosen for illustration happen to approximate those of Alnico V. Thus curve 81 represents the magnetizing curve of Alnico V. Starting at the zero position and assuming that more and more magnetizing force is applied, the flux density would increase following the line 81. After saturation is reached at 82, if the magnetizing force is removed, the flux density will decrease following the line 83. The point of maximum residual flux is the point where the curve 83 crosses the vertical axis representing zero magnetizing force and no factors tending to cause a knockdown. Any of the ordinary useful designs of permanent magnets include a gap of some sort in the magnetic circuit which has some knockdown tendency. For stability, it is common to apply a further knockdown force. This conventionally comprises a demagnetizing force, such as an alternating magnetic field. As the knockdown force is increased, the flux density in the magnet would decrease following the curve 84. If the knockdown force is enough to carry the flux density down to the point 85 and is then removed, the magnet will thenceforth operate on a minor hystersis curve 86, or a loop including also a return curve branching off from curve 86 and therefore being in part slightly higher. The slope of this curve 86 indicates the incremental permeability of the magnet operating on this curve. Thus it is seen that if the normal circuit of the magnet was such that it operated at approximately the midpoint of curve 86 and a change occurred which amounted to a slight increase of magnetizing force or decrease of knockdown force, the flux density would advance to the right along the curve 86. Since this curve is of very low slope, it follows that the incremental permeability is low. Thus the increase of flux density for a given change of force is very slight.

It may be observed that the low incremental permeability for soft iron is better illustrated by the magnetization curve in the region of the point 82. Assuming now that curve 81 represents the magnetization curve of soft iron, 82 would be the point of saturation thereof. It will be seen that in the vicinity of this point the curve has a very low slope, thus again indicating a small incremental permeability. In other words, a given increase of magnetizing force again produces but a slight change in flux density.

The low incremental permeability is especially important at the radial gap, and some fairly good structures might not provide it at the axial gap.

For the most part, the attraction poles of magnetic suspensions heretofore proposed have shown no awareness by their designers of the desirability of a low incremental permeability. For example, in most instances, soft iron pole pieces have been used, with a flux density not even approaching saturation. Here the incremental permeability of the poles might well be in the neighborhood of 1,000 with the result that there would be a very great increase of flux density upon reducing the gap length. In the few instances in which permanent magnets have been used for one or both of the attraction poles, the magnet material has not been of a type to provide a very low incremental permeability or the arrangement has not been such as to make good use of the low incremental permeability. For example, where there are no well-defined pole faces directly opposite one another, the low incremental permeability is not nearly so effective, in that it cannot prevent excessive shifting of flux concentration, especially as to flux flowing somewhat transversely of the original direction of magnetization.

The only prior instances using directly facing poles for both an axial gap and a radial gap were severely inadequate in the matter of incremental permeability, not more than one of the four pole faces having an incremental permeability lower than non-saturated soft iron, and that one having an unknown incremental permeability probably well above 35, which is about as high as anyone could go with even a faint claim to utilizing the principle of low incremental permeability.

One feature of the invention, which by variations could be attained without the others, is the exceptional resistance to stray field effects. This results from surrounding all of the permanent magnets within the iron cup 14, especially when the magnets are stabilized with a fairly high knockdown force, say equivalent to at least 150 oersteds, and preferably over 250. This requires a high coercive force material, a material of at least approximately 400 oersteds being preferred for this and other reasons. The exact knockdown force used will naturally depend on the material chosen.

Modifications

There are of course many modifications which can be made in the utilizations of the principles of this invention. Although some of them will involve inferior use of these principles, it is believed to be helpful to point out some of the possible modifications. Probably some of the principles of the invention could still be used in spite of some such modifications, though it is not intended to imply that any of the invention would be left if all of the modifications were used at once. The member 13, which is preferably a permanent magnet, could conceivably be soft iron. One or both of the poles 17 and 18 which at present are deemed preferably annular could be in the form of a solid circle. If both solid circles, each could have equivalent total face area (or enough area to provide the necessary attraction). The magnet 11 could be made up of two or more permanent magnets, particularly using a different magnetic material for the radially extending portion from poles 19. In this connection, it may be noted that all of the poles could probably be formed of magnetic materials having lower coercive force, even down to 3% chrome steel, though considerable loss of sharpness of positioning and higher side thrust might result. Also, there could probably be some soft iron in the part 11, especially its pole tip portions, if pole 18 is a permanent magnet. In a form now contemplated, 11 is a permanent magnet and portion 18 is iron, integral with cup 14 for economy. Nevertheless, it should be borne in mind that it is important that, preferably at each gap, at least one pole portion adjacent the gap be either saturated or a permanent magnet and preferably a permanent magnet of high coercivity and low incremental permeability.

In fact, time may show that each of the modifications mentioned in the above paragraph, except making magnet 11 of two pieces, would result in such inferiority as to be resorted to only for great economy or in an effort to avoid infringement of this patent.

Method of magnetization

As previously indicated, it is important, especially with the highly coercive magnetic metals here contemplated, that substantially all of the magnetizing flux passing in the vicinity of the pole faces, pass through these pole faces in a direction perpendicular to them. This is accomplished by the method and means of magnetization (developed by applicant Milligan alone and toward which a later application by him is directed) diagrammatically indicated in Figs. 2 and 3. In these figures the small circles indicate cross sections of wires or coils, each extending all around the vertical axis of the assembly. In these circles have been shown dots or crosses to represent the direction of current in a conventional manner. Thus in the coil or wire sections marked with a dot the current is flowing toward the viewer (out from the paper) while in the coils or wires marked with a cross, the current is flowing away from the viewer (into the paper).

Fig. 2 shows the magnetization of the magnets 13 and 16, this being performed after they are secured in place as part of the stator 12. The rotor 12 is applied over a magnetizing spindle 41 which carries various turns of wire or coils 42, 43, 44, 45, 46, 47, 48 and 49, through which the magnetizing current may be passed. In addition, coils or turns of wire 53, 54, 55 and 56 are provided, being carried by the same fixture by which the spindle 41 would be carried. These wires are all arranged in such manner as not to interfere with the movement of the rotor 12 to and from the position shown. In addition, turns or coils 57 may be provided as shown. They may be flexible coils worked into place just before application of the rotor 12.

Preferably all of the coils 42 to 57 are connected in one series circuit. Conventional sources of magnetizing current may be used. One common source is a capacitor, the very brief heavy surge of current from a capacitor being sufficient. A sufficient magnetizing force can be produced by a given number of ampere turns, even of brief duration. Repeated shots are sometimes desirable.

Any suitable passages, such as 58 and 59 may be provided for the passage of lead wires to the various coils 42 to 49 and 57, these preferably being positioned where they will not appreciably disturb the flux in the vicinity of the magnets being magnetized. These lead wires may be fairly small if the current used is kept reasonably small by virtue of having a number of turns in each of the coils illustrated. Five turns is believed to be appropriate in each instance. Usually the turns will be side by side, axially arranged with respect to one another and perhaps even spaced slightly apart. For example, the various coils 42 to 47 could advantageously be a fairly uniform helix with perhaps 30 turns. It is, however, desirable to take special care to make sure that the turns near the position of the coil 45 are positioned approximately as shown, or possibly even closer to pole face 18, all around the magnet 13. Coils 48 and 49 should be carefully placed with respect to coils 44 and 45, so as to ensure uniform flow of flux along the main path through magnet 13. Adjacent each pole face all coils should be as uniform as possible to ensure uniformity of pole strength and connecting wires should extend out steeply so as not to affect the flux in the magnet.

The rotor 11 would be magnetized in a very similar manner as illustrated in Fig. 3. Here it would be inserted into a fixture 61 having a suitable aperture 62 for lead-in wires to coils 64 to 69. The coils 65 to 68 may have a sufficient internal diameter to permit the insertion of the rotor 11. After insertion of the rotor 11, coils 70 and 71 would be applied approximately as illustrated to ensure full magnetization of the radial portion of the magnet 11 with flux passing perpendicularly through face 19.

Although coils similar to coils 48 and 49 could be provided, an alternative is shown which could also be shown in Fig. 2. This comprises a plug 72 of copper or other metal of high conductivity. This may be in the form of a solid plug or a ring as illustrated. Upon the initial application of the magnetizing flux, eddy currents are induced in this plug which have very much the same effect as the current in coils 48 and 49. They resist the buildup of magnetizing flux through the plug and simultaneously boost the flow of flux in the magnetizing disk outside of the plug. Although this has been shown as an alternative, it is believed that the coils of 48 and 49 will be found to be preferable on account of being more readily controlled for an exact effect.

Typical dimensions

Although dimensions may be varied quite widely, especially for different purposes, or with different forms of the invention, it may be helpful to set forth dimensions which tests so far made show would be satisfactory in the illustrated form for a rotating element weighing about 16 grams, such as is common in watthour meters. As a matter of fact, the drawings have been drawn reasonably closely to scale for a design which (except as noted) is at present believed to be preferable for this purpose. Of course, it is to be expected that still better designs will be worked out, however, as is usually the case with inventions representing a wide departure from the prior art. All dimensions are given in inches.

In the form illustrated, the gap 26 is .039, the radial width of pole faces 17 and 18 .015 and their outside diameter is .308. The gap 27 is .012, the radial width of the pole faces 19 and 21 is .050, and the diameter of pole 19 is .454. The magnet 13 from face 18 to the shoulder abutting yoke 14 is .400 and the magnet 11 from face 17 to its bottom end face is .480.

To define the preferred pole face dimensions in terms applicable to both the permanent magnet pole face type and the type having saturated soft iron pole faces, it is noted that in both of them the pole faces are long enough in the annular direction so that the required attraction can be provided with a total concentrated flux value, from the pole face proper, not over 1,000 lines per linear inch of annular pole face length, and narrow enough so that magnetic material close to the face and through a length of .080" back from the face operates at an incremental permeabillity at least as low as 10.

The cross-sectional area of the poles perpendicular to the flux paths through them should not increase much rearwardly of the pole faces. The taper shown approaching pole face 19 does not represent any appreciable increase in cross-sectional area, this much taper being necessary to compensate for reduction in the annular dimension as the axis is approached. Other poles have been shown with a slight increase of cross-section, possibly more than the optimum if less increase would result in less leakage flux through the sides. In the case of soft iron poles an increase of cross-sectional area just sufficient to maintain saturation in spite of leakage flux (inevitable with soft iron) is preferred.

In some respects it would be desirable to have the outside diameter of poles 17 and 18 approximately equal to that of pole 19, but a smaller size has been chosen so that pole 17 may be inserted through pole 21 without coming close enough thereto to present any danger of partial demagnetization of one by the other. As a further safeguard along this line, it would be good commercial practice to provide a spacer of non-magnetic material around pole 17 to avoid danger of such contact from careless handling. Likewise, a very thin non-magnetic spacer may be provided around pole 19 to be sure that possible contact between poles 19 and 21 does not produce any non-uniformity which could tend to lock the structure magnetically against rotation. Of course this last-mentioned spacer should be thin enough so that it would not come in contact with the pole 21 during normal operation. A very slight thickness is sufficient in this instance, such as that of common copper or nickel plating, perhaps .002.

With only soft iron poles, contact during insertion might be harmless, and the poles 17 and 18 could therefore be approximately as large in diameter as pole 19. The flux density of soft iron poles, saturated in accordance with one phase of this invention, is high enough so that narrow pole faces, in the order of .005, would be preferred. The supporting brackets 91 and 92 are represented only diagrammatically.

Special mention of the internal diameter of the axial poles may be helpful. This should be great enough so that the attraction of a pole portion of the rotor for the immediately opposite pole portion of the stator is not excessively offset by attraction for a diametrically opposite portion of the stator pole—or for the parts between the two. With high coercive permanent magnet poles, this requirement is not likely to be violated because the magnetic potential is strongest at the face, which is much closer to the directly opposite pole portion than to the diametrically opposite pole portion. With soft iron poles, however, the potential is higher rearwardly of the pole and the problem of a sufficient spacing of each pole portion from diametrically opposite (or other transversely spaced) pole portions is more severe. No pole portion within one average gap length rearwardly of a given pole face portion and having a potential as high as that of the face should be less than three times as far from a laterally spaced attraction pole portion as from the pole portion directly opposite said pole face portion; and five or ten times as far is preferred.

Either pole of each gap may be radially slotted, if desired. This is particularly desirable at the radial gap for a pole having an incremental permeability more than 10, and is of decreasing desirability in proportion to the lowness of the incremental permeability. With a high incremental permeability there is a tendency, when the rotor is laterally off center, for flux to migrate from its usual course to the zone where the radial gap is smallest. If soft iron is used for a radial pole, it may therefore be desirable to slot it, and even to use laminations lying in axial planes for the entire length of the soft iron. This laminated strucure could also be of permanent magnet material such as Cunife I, though the need for laminations would be less.

We claim:

1. A magnetic suspension unit including a rotor rotatable about a given axis and having magnetic material forming an annular axially facing pole face and an annular radially facing pole face, and a stator having magnetic material forming an annular axially facing pole face directly opposing that of the rotor to form an axial gap and an annular radially facing pole face directly opposing the radial pole face of the rotor when the rotor is in one position to form a radial gap; said pole faces being abruptly defined, said magnetic material including some material which is permanently magnetic and forces flux through both gaps to cause attraction between the pole faces, and the magnetic material adjacent to at least one of said pole faces of each gap being in a magnetic state having an incremental permeability as low as 10 to maintain a relatively constant flux between the faces in said gaps in spite of minor changes in relative positioning of the pole faces.

2. A magnetic suspension unit including a rotor rotatable about a given axis and having magnetic material forming an annular axially facing pole face and an annular radially facing pole face, and a stator having magnetic mterial forming an annular axially facing pole face directly opposing that of the rotor to form an axial gap and an annular radially facing pole face directly opposing the radial pole face of the rotor when the rotor is in one position to form a radial gap; said pole faces being abruptly defined, said magnetic material including some material which is permanently magnetic and forces flux through both gaps to cause attraction between the pole faces, and the magnetic material adjacent to at least one of said pole faces of each gap being high coercive material, at least 400 oersteds, operating on an inner hysteresis loop in a magnetic state having an incremental permeability as low as 10 to maintain a relatively constant flux between the faces in said gaps in spite of minor changes in relative positioning of the pole faces.

3. A magnetic suspension unit including a rotor rotatable about a given axis and having magnetic material forming an annular axially facing pole face and an annular radially facing pole face, and a stator having magnetic material forming an annular axially facing pole face directly opposing that of the rotor to form an axial gap and an annular radially facing pole face directly opposing the radial pole face of the rotor when the rotor is in one position to form a radial gap; said pole faces being abruptly defined, said magnetic material including some material which is permanently magnetic and forces flux through both gaps to cause attraction between the pole faces, the magnetic material adjacent to at least one of said pole faces of each gap being high coercive material, at least 400 oersteds, operating on an inner hysteresis loop in a magnetic state having an incremental permeability as low as 10 to maintain a relatively constant flux between the faces in said gaps in spite of minor changes in relative positioning of the pole faces, and the magnetic material adjacent at least one other pole face being permanently magnetic in a state having an incremental permeability as low as approximately 35.

4. A magnetic suspension unit including a rotor rotatable about a given axis and having magnetic material forming an annular axially facing pole face and an annular radially facing pole face, and a stator having magnetic material forming an annular axially facing pole face directly opposing that of the rotor to form an axial gap and an annular radially facing pole face directly opposing the radial pole face of the rotor when the rotor is in one position to form a radial gap; said pole faces being abruptly defined, said magnetic material including some material which is permanently magnetic and forces flux through both gaps to cause attraction between the pole faces, and the magnetic material adjacent all of said pole faces being in a magnetic state having an incremental permeability as low as 10 to maintain a relatively constant flux between the faces in said gaps in spite of minor changes in relative positioning of the pole faces.

5. A magnetic suspension unit including a rotor rotatable about a given axis and having magnetic material forming an annular axially facing pole face and an annular radially facing pole face, and a stator having magnetic material forming an annular axially facing pole face directly opposing that of the rotor to form an axial gap and an annular radially facing pole face directly opposing the radial pole face of the rotor when the rotor is in one position to form a radial gap; said pole faces being abruptly defined, said magnetic material including some material which is permanently magnetic and forces flux through both gaps to cause attraction between the pole faces, and the magnetic material adjacent all of said pole faces being high coercive material, at least 400 oersteds, operating on an inner hysteresis loop in a magnetic state having an incremental permeability as low as 10 to maintain a relatively constant flux between the faces in said gaps in spite of minor changes in relative positioning of the pole faces.

6. A magnetic suspension unit including a rotor rotatable about a given axis and having magnetic material forming an annular axially facing pole face and an annular radially facing pole face, and a stator having magnetic material forming an annular axially facing pole face directly opposing that of the rotor to form an axial gap and an annular radially facing pole face directly opposing the radial pole face of the rotor when the rotor is in one position to form a radial gap; said pole faces being abruptly defined, said magnetic material including some material which is permanently magnetic and forces flux through both gaps to cause attraction between the pole faces, and the magnetic material adjacent all of said pole faces being high coercive material, at least 400 oersteds, operating on an inner hysteresis loop in a magnetic state having an incremental permeability as low as approximately 35 to maintain a relatively constant flux between the faces in said gaps in spite of minor changes in relative positioning of the pole faces.

7. The combination of an element angularly movable about a vertical axis and a magnetic suspension unit including a rotor rigid with the element, movable with it and having magnetic material terminating at spaced points in an annular axially facing pole face and an annular radially facing pole face, and a stator having magnetic material terminating at spaced points in an annular axially facing pole face directly opposing that of the rotor to form an axial gap and an annular radially facing pole face directly opposing the radial pole face of the rotor when the rotor is in one position to form a radial gap, a portion of said magnetic material being a permanent magnet and forcing flux through both gaps in series to cause attraction between the pole faces, the magnetic material adjacent to at least one of said pole faces of each gap being permanent magnet material magnetized to concentrate flux through said pole face and being of a magnetic state having an incremental permeability as low as 10 to maintain a relatively constant flux between the faces in said gaps in spite of minor changes in relative positioning of the pole faces, said element being held magnetically in floating suspension vertically by said suspension unit with said rotor approximately in said one position.

8. The combination of an element angularly movable about a vertical axis and a magnetic suspension unit including a rotor rigid with the element movable with it and having magnetic material terminating at spaced points in an annular axially facing pole face and an annular radially facing pole face, and a stator having magnetic material terminating at spaced points in an annular axially facing pole face directly opposing that of the rotor to form an axial gap and an annular radially facing pole face directly opposing the radial pole face of the rotor when the rotor is in one position to form a radial gap, a portion of said magnetic material being a permanent magnet and forcing flux through both gaps in series to cause attraction between the pole faces, the magnetic material adjacent to at least one of said pole faces of each gap being permanent magnet material magnetized to concentrate flux through said pole face and being of a magnetic state having an incremental permeability as low as 10 to maintain a relatively constant flux between the faces in said gaps in spite of minor changes in relative positioning of the pole faces, said element being held magnetically in floating suspension vertically by said suspension unit with said rotor approximately in said one postion, and centering means for at least approximately centering said rotor laterally on said axis.

9. A magnetic suspension unit including a rotor rotatable about a vertical axis and having magnetic material terminating at spaced points in an annular axially facing pole face and an annular radially facing pole, and a stator having magnetic material terminating at spaced points in an annular axially facing pole face directly opposing that of the rotor to form an axial gap and an annular radially facing pole face directly opposing the radial pole face of the rotor when the rotor is in one position to form a radial gap, some of said magnetic material being permanently magnetic and forcing flux through both gaps in series to cause attraction between the pole faces, the magnetic material adjacent to at least one of said pole faces of each gap being permanent magnet material magnetized to concentrate flux through said pole face and being of a magnetic state having an incremental permeability as low as 10 to maintain a relatively constant flux between the faces in said gaps in spite of minor changes in relative positioning of the pole faces.

10. A magnetic suspension unit including a rotor rotatable about a vertical axis and having magnetic material terminating at spaced points in an axially facing pole face and an annular radially facing pole face, and a stator having magnetic material terminating at spaced points in an axially facing pole face directly opposing that of the rotor to form an axial gap and an annular radially facing pole face directly opposing the radial pole face of the rotor when the rotor is in one position to form a radial gap, some of said magnetic material being permanently magnetic and forcing flux through both gaps to cause attraction between the pole faces, at least one of the pole faces being formed by a pole in which some of the material is permanently magnetic and magnetized to concentrate flux through the pole face and is in a magnetic state having an incremental permeability as low as 10.

11. A magnetic suspension unit for a movable part in accordance with claim 10 in which one gap is formed by narrow annular poles of opposite polarity facing one another directly and relatively movable in the direction in which they are narrow, the pole walls adjacent said faces receding from one another steeply, and the magnetic material adjacent said pole faces and for at least the average width of the gap rearwardly from each, operating in a magnetic state having an average incremental permeability at least as low as approximately 35.

12. A magnetic suspension unit for a movable part in accordance with claim 10 in which one gap is formed by narrow annular poles of opposite polarity facing one another directly and relatively movable in the direction in which they are narrow, the pole walls adjacent said faces receding from one another steeply, and the magnetic material adjacent said pole faces and for at least the average width of the gap rearwardly from each, operating in a magnetic state having an average incremental permeability at least as low as approximately 10.

13. A magnetic suspension unit for a movable part in accordance with claim 10 in which one gap is formed by narrow annular poles of opposite polarity facing one another directly and relatively movable in the direction in which they are narrow, the pole walls adjacent said faces receding from one another steeply, and the magnetic material adjacent said pole faces and for at least the average width of the gap rearwardly from each, being material of coercive strength at least as high as 400 oersteds and operating in a magnetic state having an average incremental permeability at least as low as approximately 10.

14. A magnetic suspension unit for a movable part in accordance with claim 10 in which one gap is formed by poles of opposite polarity facing one another directly and relatively movable in a direction parallel to the faces and perpendicular to the edges thereof, the pole walls adjacent said faces receding from one another steeply, and the magnetic material adjacent said pole face and for at least the average width of the gap rearwardly from each, operating in a magnetic state having an average incremental permeability at least as low as approximately 35.

15. A magnetic suspension unit supporting the weight of a rotating element entirely magnetically including two pairs of opposing annular poles, including a pair of annular poles lying in generally horizontal planes, having opposed faces facing one another radially across a short gap, and normally aligned except for axial displacement due to an axial force other than at the gap, said unit including permanent magnet means forcing flux through the gap between said faces; and mechanical bearing means for resisting radial displacement of one pole eccentrically of the other; said faces each being abruptly terminated, in the direction of the relative displacement of the other face from it, by a surface extending sharply away from the face generally in the direction away from the other face, each of said poles having its material throughout a zone from its faces to a substantial distance rearwardly therefrom in a magnetic condition having its incremental permeability at least at low at 10, and each of said poles being formed essentially of a material having a coercive force of at least 400 oersteds, magnetized to concentrate flux through its face opposing the other face of its pair.

16. A magnetic suspension unit including two parts, one a rotor rotatable about a given axis and having magnetic material forming two separated annular pole faces, the other a stator having magnetic material forming two annular pole faces directly opposing those of the rotor, one of said parts including an outer shell of non-permanent magnetic material surrounding the remainder of said unit and forming part of a magnetic path between the two pole faces of said part, and all of the remaining parts of the magnetic material of said suspension unit being in such magnetic state as to retain substantially no magnetic change after a magnetic force of 150 oersteds is applied to it and removed.

17. A magnetic suspension unit including a rotor rotatable about a vertical axis and having magnetic material terminating at spaced points in pole faces, at least one of which is annular, and a stator having magnetic material terminating at spaced points in pole faces, one of which is annular and directly opposes the annular pole face of the rotor when the rotor is in one position to form a gap, some of said magnetic material being permanently magnetic and forcing flux through the gap to cause attraction between the pole faces thereof, at least one of the annular pole faces being formed by a pole in which some of the material is in a magnetic state having an incremental permeability as low as 10, said pole having its pole face abruptly defined by a region on each side of the pole having the permeabiilty of air.

18. A magnetic suspension unit including a pair of annular poles lying in generally horizontal planes facing one another radially across a short gap, and aligned except for downward displacement of one by gravity, and said unit including permanent magnet means for energizing said poles to force flux through the gap between them; the upper of said poles having a nearly horizontal rearwardly extending wall at the bottom edge of its face, and the lower of said poles having a nearly horizontal rearwardly-extending wall at the top edge of its face, at least one of said poles being formed essentially of permanent magnet material in a magnetic state having an incremental permeability at least as low at 10.

19. A magnetic suspension unit including a pair of annular poles lying in generally horizontal planes facing one another radially across a short gap, and aligned except for downward displacement of one by gravity, and said unit including permanent magnet means for energizing said poles to force flux through the gap between them; the upper of said poles having a nearly horizontal rearwardly extending wall at the bottom edge of its face, and the lower of said poles having a nearly horizontal rearwardly-extending wall at the top edge of its face, each of said poles having its material throughout a zone from its face to a substantial distance rearwardly therefrom in a magnetic state having its incremental permeability at least as low as 10, and at least one of said poles being formed essentially of a material having a coercive force of at least 400 oersteds, magnetized in a direction concentrating flux through its face.

20. A magnetic suspension unit including two parts, forming a magnetic circuit, one a rotor rotatable about a given axis and having magnetic material forming two separated annular pole faces, the other a stator having magnetic material forming two annular pole faces directly opposing those of the rotor; one of said parts including an outer shell of non-permanent magnetic material surrounding the remainder of said unit and forming part of a magnetic path between the two pole faces of said part, and all of the remaining parts of the magnetic circuit permanent magnet material is of such character as to retain substantially no magnetic change after a magnetic force of 150 oersteds is applied to it and removed.

21. A magnetic suspension unit including a rotor rotatable about a vertical axis and entirely supported magnetically, said rotor having an annular pole with its face facing radially outward and abruptly defined along the upper and lower edges of the face by surfaces of the pole extending generally from the face toward the axis, a stator having an annular pole closely surrounding said rotor pole with its face facing radially toward the rotor pole face and abruptly defined along upper and lower edges of the face by pole surfaces extending generally from the face away from the axis; said unit including permanent magnet means for energizing said poles oppositely to force flux through the gap between them, and mechanical means for resisting radial displacement of the rotor eccentrically of the stator; at least one of said poles being in the form essentially of permanent magnet material magnetized for concentrating flux through its radially facing face and in a magnetic condition having an incremental permeability at least as low as 10.

22. A magnetic suspension unit supporting a rotating element entirely magnetically including a pair of annular poles lying in generally horizontal planes, having opposed faces facing one another radially across a short gap, and aligned except for axial displacement due to an axial biasing force, said unit including permanent magnet means for energizing said poles oppositely to force flux through the gap between them; and mechanical bearing means for resisting radial displacement of one pole eccentrically of the other; said faces each being abruptly terminated, in the direction of the relative displacement of the other face from it, by a surface extending sharply away from the face generally in the direction away from the other face, at least one of said poles being formed essentially of permanent magnet material magnetized for concentrating flux through its radially facing face and in a magnetic condition having an incremental permeability at least as low as 10.

23. A magnetic suspension unit supporting a rotating element entirely magnetically including a pair of annular poles lying in generally horizontal planes, having opposed faces facing one another radially across a short gap, and aligned except for axial displacement due to an axial biasing force, said unit including permanent magnet means for energizing said poles oppositely to force flux through the gap between them; and mechanical bearing means for resisting radial displacement of one pole eccentrically of the other; said faces each being abruptly terminated, in the direction of the relative displacement of the other face from it, by a surface extending sharply away from the face generally in the direction away from the other face, each of said poles having its material throughout a zone from its face to a substantial distance rearwardly therefrom in a magnetic condition having its incremental permeability at least as low as 10, and at least one of said poles being formed essentially of a material having a coercive force of at least 400 oersteds, magnetized generally in a direction concentrating flux through its radially facing face.

24. A magnetic suspension according to claim 21 except that either pole may be the movable pole and the sharp demarkation of each pole face may be only in the critical direction, namely the axial direction of magnetic attraction toward the other pole resulting from the axial displacement of the poles produced by the bias.

References Cited in the file of this patent

UNITED STATES PATENTS

| | | |
|---|---|---|
| 2,333,647 | Green | Nov. 9, 1943 |
| 2,585,714 | Wrobel et al. | Feb. 12, 1952 |
| 2,747,944 | Baermann | May 29, 1956 |

FOREIGN PATENTS

| | | |
|---|---|---|
| 3,507 | Great Britain | of 1898 |
| 322,995 | Great Britain | Dec. 16, 1929 |